No. 859,070. PATENTED JULY 2, 1907.
E. KEMPSHALL.
TIRE.
APPLICATION FILED MAY 8, 1906.
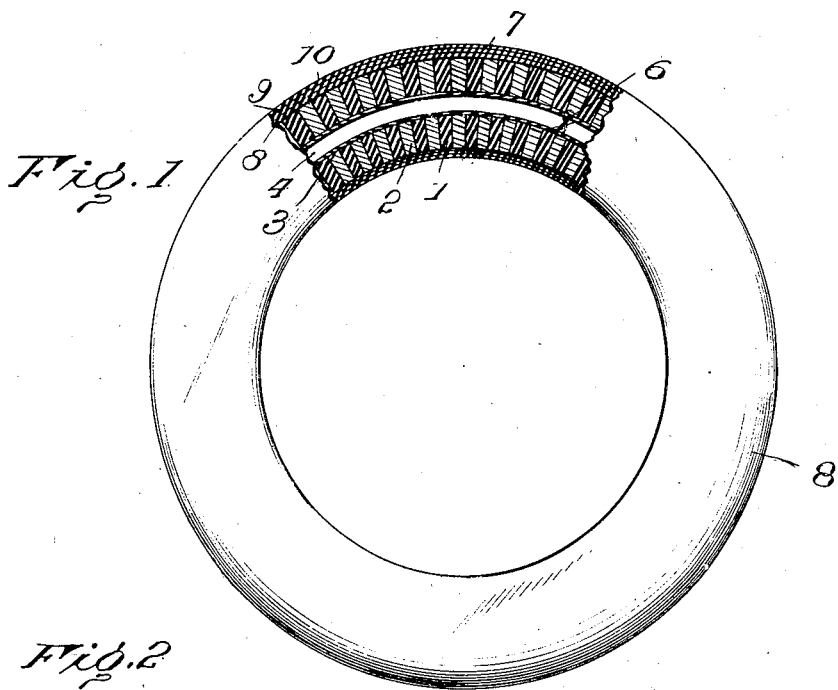
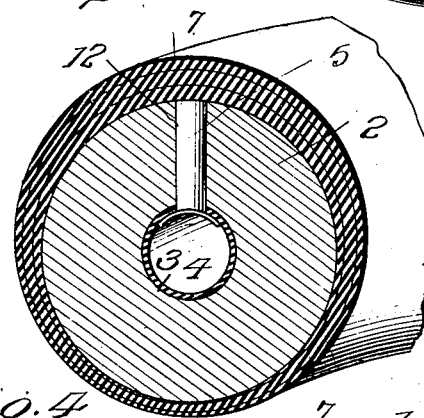
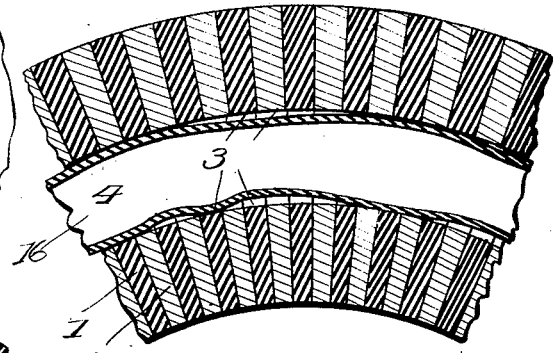
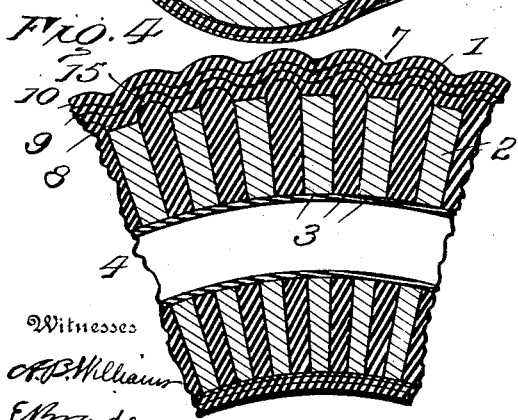
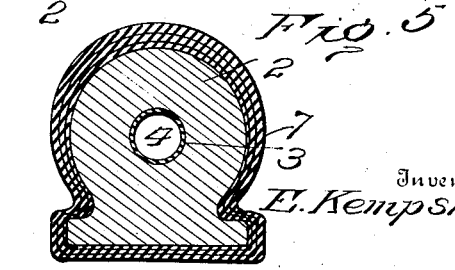
Inventor
E. Kempshall
Witnesses
By
Attorney

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

TIRE.

No. 859,070.             Specification of Letters Patent.            Patented July 2, 1907.

Application filed May 8, 1906. Serial No. 315,808.

*To all whom it may concern:*

Be it known that I, ELEAZER KEMPSHALL, a citizen of the United States, residing at Boston, in the county of Suffolk and State of Massachusetts, have invented certain new and useful Improvements in Tires, of which the following is a specification.

This invention relates to improvements in tires.

In the organization of a tire formed of sections of resilient and non-resilient material, and inclosed by a resilient covering, I have found it necessary to provide means for supporting the center of the resilient sections, to properly and practically vulcanize the resilient parts of the tire. To accomplish this end I propose to string the sections forming the tire on a deflated rubber tube, and when a sufficient number of them have been assembled in tire form the ends of the tube are tied and the latter is blown up. After the tube is blown up, the cover is applied and a double function is accomplished. In the process of vulcanizing, the inflated tube pressing on the inner edges of the resilient sections co-operates with the mold, and absolute and practical vulcanization of the rubber takes place. The inflated tube serves also to add the qualities of the pneumatic feature to the tire, the sections yielding with the tube when the load strain is applied.

Other objections and advantages will be hereinafter referred to and particularly pointed out in the claims.

In the drawings—Figure 1, is an elevation of a tire, parts being broken away to illustrate the invention. Fig. 2, is a sectional perspective of a portion of the tire. Fig. 3, is a vertical section of a portion of the tire. Fig. 4 is a similar view of a slightly different form of the invention. Fig. 5 is a cross section of a tire having a somewhat different shape.

The same numerals refer to like parts in all the figures.

1, indicates resilient sections, and 2, relatively non-resilient sections of material such as leather, each of said sections being formed with an opening 3. The sections 1 and 2, are alternately strung on a deflated vulcanized rubber tube 4, having a valve 5. After a sufficient number of sections have been assembled on the tube 4, the ends of the latter are tied as at 6; then air under pressure is injected into the tube through valve 5, in the usual manner, until the tube is filled to its utmost capacity. In the preferred embodiment of the invention the diameter of the sections is the same, when the tube is inflated consequently they will be even and correct in form to receive the cover 7. Cover 7, is composed of rubber and fabric of appropriate character, as shown at 8, 9 and 10. The layer of rubber 8, is first wrapped, or applied to the tire form of sections, then the fabric 9, wrapped or applied to strengthen the rubber 8, after which outer layer or layers of rubber 10, incases the fabric. The cover as a whole may be of uniform thickness throughout, or be thickened at the tread portion as may be desirable.

In applying the cover it is to be understood that the valve 5, is hidden from view, it being embedded in one of the sections, as shown at 12. As the inner tube is primarily intended to co-operate with the mold when the tire is vulcanized, obviously it will not be necessary to inflate it should the air escape after the tire is completed. The cover having been applied to the sections, the tire form is placed in a mold to be vulcanized. It is of the utmost importance at this stage of the operation of completing the tire that pressure outwardly toward the rim be applied to the tire, inasmuch as the pressure inwardly of the mold must be counteracted. Therefore the inflated tube 4, pressing out, and the mold pressing in, enables me to successfully vulcanize all the rubber involved in the make up of the tire. Furthermore, the inner inflated tube adds the pneumatic feature to the tire, which co-operating with the resilient and reinforcing sections, which produces a tire preserving the necessary resilient qualities, with the added pneumatic feature.

Because of the tube being primarily inserted in the composition of the tire to improve and permit of the vulcanization of the rubber, it matters little should the air escape. The resilient and non-resilient sections are quite sufficient to withstand the pressure, however, the inflated tube adds strength and durablity for heavy load strains. When vulcanizing the tire the resilient sections become secured to the tube 4, while the sections 2, being of non-resilient material, remain loose on said tube. In Fig. 4 I have shown the resilient sections extended somewhat beyond the face of the nonresilient sections, as shown at 15, and the cover correspondingly projected. This construction furnishes a tire with a roughed tread, the resilient character of the projections giving sufficiently to prevent the edges of the resilient sections cutting the rubber when the latter is compressed.

What I claim is:

1. A tire composed of transversely arranged resilient and relatively non-resilient sections of material formed with openings, an inflated tube fitted in the openings, said tube being vulcanized to the resilient sections, means for inflating the tube, and a cover incasing the sections, said cover and the resilient sections being vulcanized to bind the sections together.

2. A tire composed of transversely arranged resilient and non-resilient sections of material formed with openings, means for exerting pneumatic pressure outwardly on the interior of the transversely arranged sections before a cover is applied, and a cover incasing the sections, said cover being vulcanized to the resilient sections and the pneumatic pressure means being vulcanized to the interior of the resilient sections.

3. A tire composed of transversely arranged resilient and non-resilient sections placed side by side and contacting with each other and formed with openings to provide an annular tube receptacle, an inflated tube fitting in the openings in the sections, a valve in the tube, and a cover incasing the sections and the valve, said cover being vulcanized to the resilient sections.

4. A tire composed of resilient and relatively non-resilient sections of material placed side by side and contacting with each other throughout their entire flat surfaces, the resilient sections extending beyond the non-resilient sections, and a cover incasing and contacting with the outer edges of all the sections and vulcanized to the resilient sections, the variation in size of the sections forming a series of ribs.

5. A tire composed of resilient and relatively non-resilient sections of material formed with openings, the resilient sections extending beyond the non-resilient sections, an inflated tube in the openings, and a cover incasing the sections and vulcanized to the resilient sections, the extended resilient sections and covering over the same forming a roughened tread.

6. A tire composed of transversely arranged resilient and relatively non-resilient sections of material, and inflated tube inclosed within the sections, vulcanized to the resilient sections to provide a core, and a cover composed of rubber and fabric incasing the sections, said cover being vulcanized to the edges of the resilient sections, and the edges of the non-resilient sections being in contact with said cover.

7. A tire composed of resilient and relatively non-resilient sections of material formed with openings, a rubber tube on which the sections are assembled, said rubber tube being vulcanized to the resilient sections, means uniting the ends of the tube, a valve for inflating the tube, and a cover composed of rubber and fabric for incasing the sections and the valve, said cover being vulcanized to the resilient sections.

8. A tire comprising alternate sections of rubber and leather, a vulcanized inflated tube inclosed by the sections, a cover composed of rubber and fabric incasing the sections, the cover being vulcanized to the resilient sections only.

9. A tire comprising transversely arranged sections of resilient and non-resilient sections of material, an inflated tube within the sections, and a resilient cover which incases the sections, said cover being vulcanized to the resilient sections and the non-resilient sections being free on the inflated tube.

In testimony whereof I have signed my name to this specification in the presence of two subscribing witnesses.

ELEAZER KEMPSHALL.

Witnesses:
   JNO. IMIRIE,
   ALICE H. BENNETT.